US010445841B2

(12) United States Patent
Meerdo et al.

(10) Patent No.: US 10,445,841 B2
(45) Date of Patent: Oct. 15, 2019

(54) SYSTEMS AND METHODS FOR EARTH-BORING ROTARY DRILL BIT SELECTION

(71) Applicant: Baker Hughes Incorporated, Houston, TX (US)

(72) Inventors: John M. Meerdo, Houston, TX (US); Scott F. Donald, Spring, TX (US); Robert A. Laing, Montgomery, TX (US); Danielle VeLoise Roberts, Montgomery, TX (US); Chaitanya K. Vempati, Conroe, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 1175 days.

(21) Appl. No.: 14/681,805

(22) Filed: Apr. 8, 2015

(65) Prior Publication Data

US 2015/0287150 A1 Oct. 8, 2015

Related U.S. Application Data

(60) Provisional application No. 61/977,040, filed on Apr. 8, 2014.

(51) Int. Cl.
*G06Q 50/08* (2012.01)
*G06Q 10/06* (2012.01)

(52) U.S. Cl.
CPC ....... *G06Q 50/08* (2013.01); *G06Q 10/06313* (2013.01)

(58) Field of Classification Search
CPC ................ G06Q 50/08; G06Q 10/06313
USPC .......................................... 703/10
See application file for complete search history.

(56) References Cited

U.S. PATENT DOCUMENTS

2008/0040084 A1* 2/2008 Huang ................. E21B 10/00
703/7
2014/0025529 A1* 1/2014 Honeycutt ......... G06Q 30/0621
705/26.5

FOREIGN PATENT DOCUMENTS

WO WO-2013083380 A2 * 6/2013 ............. E21B 10/00

OTHER PUBLICATIONS

Basman_2011 (Application of Neural Networks to Evaluate Factors Affecting Drilling Performance, Imperial College London Department of Earth Science and Engineering Centre of Petroleum Studies, Apr. 2011).*

* cited by examiner

*Primary Examiner* — Brian S Cook
(74) *Attorney, Agent, or Firm* — TraskBritt

(57) ABSTRACT

Systems and methods may be used to select a drill bit design for an earth-boring rotary drill bit for use in a particular drilling application. The systems may include a computer server, and a remote device configured to communicate with the computer server through a network. The computer server may include a database including information relating to normalized scores for a plurality of drill bit responses for a plurality of differing drill bit designs. The computer server may receive information from the at least one remote device, to select one or more potential drill bit designs from the at least one database based on the information, and to transmit information relating to the selected one or more potential drill bit designs to the remote device. Such systems may be used in methods of selecting drill bit designs for earth-boring rotary drill bits for use in respective drilling applications.

20 Claims, 7 Drawing Sheets

SYSTEMS AND METHODS FOR EARTH-BORING ROTARY DRILL BIT SELECTION

CROSS-REFERENCE TO RELATED APPLICATION

This application claims the benefit of U.S. Provisional Patent Application Ser. No. 61/977,040, filed Apr. 8, 2014, the disclosure of which is hereby incorporated herein in its entirety by this reference.

FIELD

The disclosure relates generally to systems and methods that may be used to select a design for an earth-boring rotary drill bit for use in forming a wellbore in a subterranean formation.

BACKGROUND

Wellbores are formed in subterranean formations for various purposes including, for example, the extraction of oil and gas from a subterranean formation and the extraction of geothermal heat from a subterranean formation. A wellbore may be formed in a subterranean formation using a drill bit, such as, an earth-boring rotary drill bit. Different types of earth-boring rotary drill bits are known in the art, including, for example, fixed-cutter bits (which are often referred to in the art as "drag" bits), rolling-cutter bits (which are often referred to in the art as "rock" bits), impregnated bits (impregnated with diamonds or other superabrasive particles), and hybrid bits (which may include, for example, both fixed cutters and rolling cutters).

An earth-boring drill bit is typically mounted on the lower end of a drill string and is rotated by rotating the drill string at the surface or by actuation of downhole motors or turbines, or by both methods. The drill string may comprise a series of elongated tubular segments connected end-to-end that extends into the wellbore from the surface of the formation. When weight is applied to the drill string and consequently to the drill bit, the rotating bit engages the formation and proceeds to form a wellbore. The weight used to push the drill bit into and against the formation is often referred to as the "weight-on-bit" (WOB). As the drill bit rotates, the cutters or abrasive structures thereof cut, crush, shear, and/or abrade away the formation material to form the wellbore. A diameter of the wellbore formed by the drill bit may be defined by the cutting structures disposed at the largest outer diameter of the drill bit.

Different types of bits work more efficiently against formations having different hardnesses. For example, bits containing inserts that are designed to shear the formation, such as fixed-cutter bits, frequently drill formations that range from soft to medium hard. These inserts often have polycrystalline diamond compacts (PDCs) as their cutting faces.

Roller cone bits are efficient and effective for drilling through formation materials that are of medium to high hardness. The mechanism for drilling with a roller cone bit is primarily a crushing and gouging action, in which the inserts of the rotating cones are impacted against the formation material. This action compresses the material beyond its compressive strength and allows the bit to cut through the formation.

For still harder formation materials, the mechanism commonly used for drilling changes from shearing to abrasion. For abrasive drilling, bits having fixed, abrasive elements are preferred, such as diamond-impregnated bits. While bits having abrasive polycrystalline diamond cutting elements are known to be effective in some formations, they have been found to be less effective for hard, very abrasive formations. For these types of formations, cutting structures that comprise particulate diamond, or diamond grit, impregnated in a supporting matrix are generally more effective.

For each type of earth-boring rotary drill bit, there are virtually innumerable designs that may be employed. For example, for a fixed-cutter earth-boring rotary drill bit, a given design involves a combination of many design parameters relating to variables such as bit diameter, size and number of blades, size and number of cutting elements, location and orientation of the cutting elements, number, location, and orientation of fluid nozzles, and presence of other features such as wear knots, depth-of-cut control features, etc.

Changing one variable may lead to improvement of one characteristic of the performance of the drill bit embodying the design, but may lead to a decline in another characteristic of the performance of the drill bit. For example, increasing the aggressiveness of the cutting elements (through their number, size, location, and orientation) may lead to increased rate of penetration, but may also reduce the durability of the cutting elements and reduce the useful life of the drill bit. Thus, selection of the design of a drill bit for a given application is a highly complex process involving a balancing of the various design parameters and their advantages and disadvantages for the various performance characteristics of the drill bit.

BRIEF SUMMARY

In one embodiment of the disclosure, a system for selecting a design for an earth-boring rotary drill bit, comprises a computer server including at least one electronic signal processor and at least one memory device, at least one remote device located remote from the computer server and configured to communicate with the computer server through a network, the at least one remote device including at least one electronic signal processor and at least one memory device. The computer server includes at least one database stored in the at least one memory device including information relating to normalized scores for each of a plurality of drill bit responses for each of a plurality of differing drill bit designs, and the computer server is configured under control of a computer program to receive information from the at least one remote device, select one or more potential drill bit designs from the at least one database based on the information received from the at least one remote device, and transmit information relating to the normalized scores for each of the plurality of drill bit responses of the selected one or more potential drill bit designs to the at least one remote device for graphical display on a display of the at least one remote device.

In another embodiment, a method of selecting a design for an earth-boring rotary drill bit, comprises receiving, in a computer server, information from the at least one remote device through a network, the computer server including at least one electronic signal processor and at least one memory device and having at least one database stored in the at least one memory device including information relating to normalized scores for each of a plurality of drill bit responses for each of a plurality of differing drill bit designs, the at least one remote device also including at least one electronic signal processor and at least one memory device, executing software using the computer server, execution of the software using the computer server resulting in automatic selection of one or more potential drill bit designs from the at least one database based on the information received from the at least one remote device, transmitting information relating to the normalized scores for each of the plurality of drill bit responses of the selected one or more potential drill bit designs to the at least one remote device, and graphically displaying the normalized scores of the plurality of drill bit responses of the selected one or more potential drill bit designs on a display of the at least one remote device.

In yet another embodiment, a method of selecting a design for an earth-boring rotary drill bit, comprises inputting information relating to a drilling application into at least one remote device, the at least one remote device also including at least one electronic signal processor and at least one memory device, transmitting the information from the at least one remote device to a computer server through a network, the computer server including at least one electronic signal processor and at least one memory device and having at least one database stored in the at least one memory device including information relating to normalized scores for each of a plurality of drill bit responses for each of a plurality of differing drill bit designs, and receiving, in the at least one remote device, a graphical representation of information relating to the normalized scores for each of the plurality of drill bit responses for each of the one or more potential drill bit designs for the drilling application from the computer server.

BRIEF DESCRIPTION OF THE DRAWINGS

While the disclosure concludes with claims particularly pointing out and distinctly claiming embodiments of the invention, various features and advantages of embodiments of the present disclosure may be more readily ascertained from the following description when read in conjunction with the accompanying drawings, in which:

DETAILED DESCRIPTION

The illustrations presented herein are not meant to be actual views of any particular system or component thereof, but are merely idealized representations employed to describe illustrative embodiments.

As used herein, the term "response" when used in relation to a drill bit means a performance characteristic of a drill bit. Drill bit responses include, but are not limited to, aggressiveness, cleaning efficiency, lateral stability, torsional stability, side-cutting aggressiveness, wear durability, and impact durability.

As used herein, the terms "graphical display" and "graphical representation" mean and include a visual display including at least one non-numerical, pictorial representation of one or more data points or collections of data.

Figure 1:
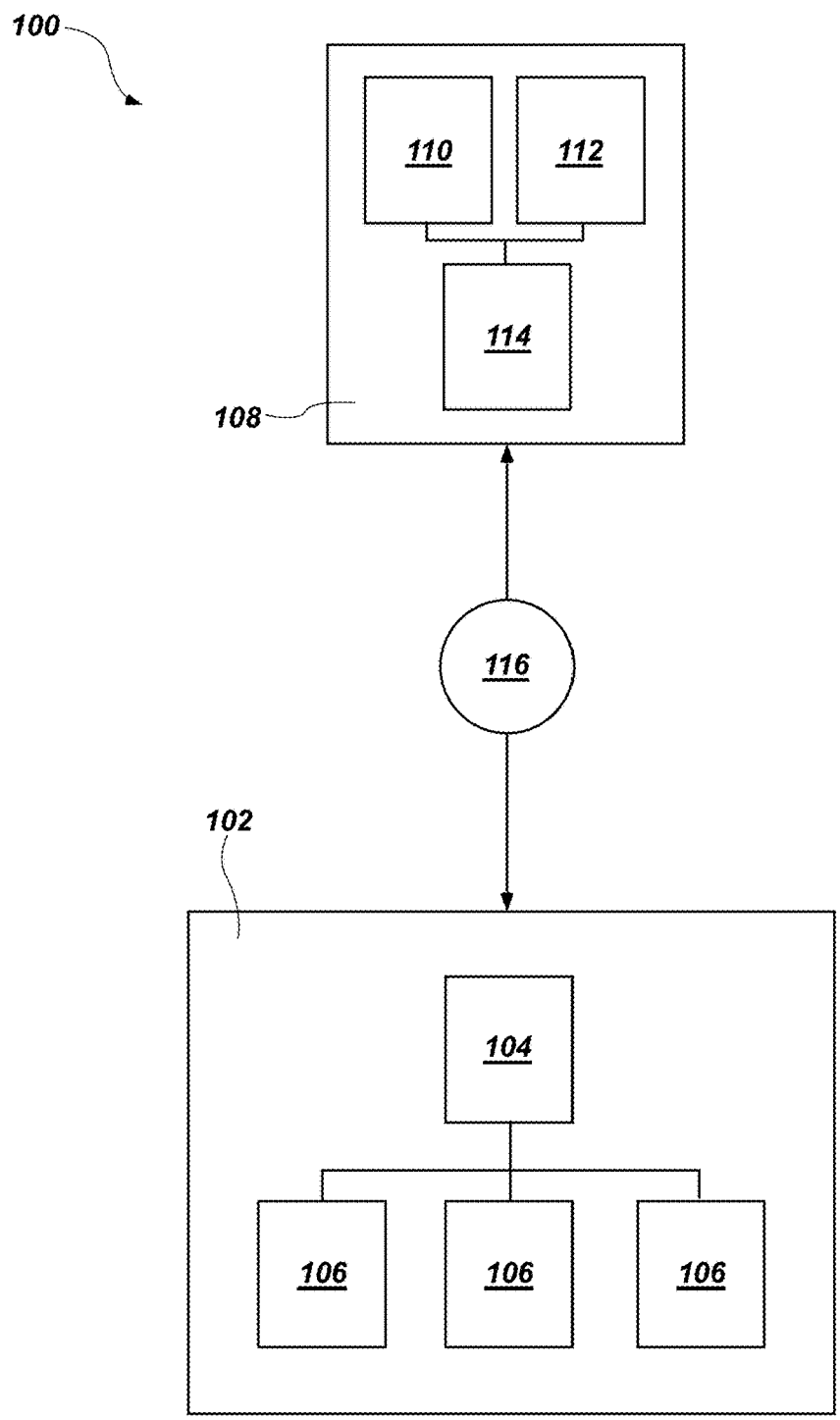
FIG. 1 is a schematically illustrated block diagram of an example of a system of the present disclosure that may be used to select a design for an earth-boring rotary drill bit.

FIG. 1 is a schematically illustrated block diagram illustrating an example system 100 according to an embodiment of the present disclosure. The system 100 may be used by both a potential user of a drill bit (such as a drilling rig operator or a field engineer) and a supplier of drill bits, to select a drill bit design to be used in a particular drilling application in accordance with methods as described herein with reference to FIGS. 2 through 10.

As shown in FIG. 1, the system 100 may include one or more computer servers 102 of, or maintained on behalf of, the drill bit supplier. The one or more computer servers 102 may include one or more electronic signal processors 104 configured to process electronic signals (e.g., logic), and one or more memory devices 106 configured to store electronic information. As discussed in further detail below, the memory device(s) 106 may contain one or more databases storing information therein relating to drill bit designs, drill bit responses, drill bit design features, technical records relating to performance of previously formed and used drill bits, and/or inventory of actual physical drill bits embodying the drill bit designs.

The system 100 also includes one or more remote devices 108. The remote devices are electronic devices configured to run drill bit design selection software. The remote device(s) may be, for example, a mobile telephone, a tablet computer, a laptop computer, or a desktop computer. Although only one remote device 108 is shown in FIG. 1, in actuality, the number of remote device(s) 108 may be from one (1) to several thousand or more, and the actual number may fluctuate with time as users download and install, and/or uninstall, the drilling application software on their remote device(s) 108. The remote device(s) may include one or more electronic signal processors 110 configured to process electronic signals (e.g., logic), one or more memory devices 112 configured to store electronic information, and at least one input/output device 114 (e.g., a display, a touchscreen display, a keyboard, a mouse, etc.).

As shown in FIG. 1, the computer server(s) 102 may be configured to communicate with the remote device(s) 108 through a network 116, such as a wide area network (e.g., the Internet).

The computer server(s) 102 and the remote device(s) may run software developed and/or maintained by the drill bit supplier to assist a user of the remote device(s) in selecting a drill bit design to be used in a particular drilling application.

Figure 2:
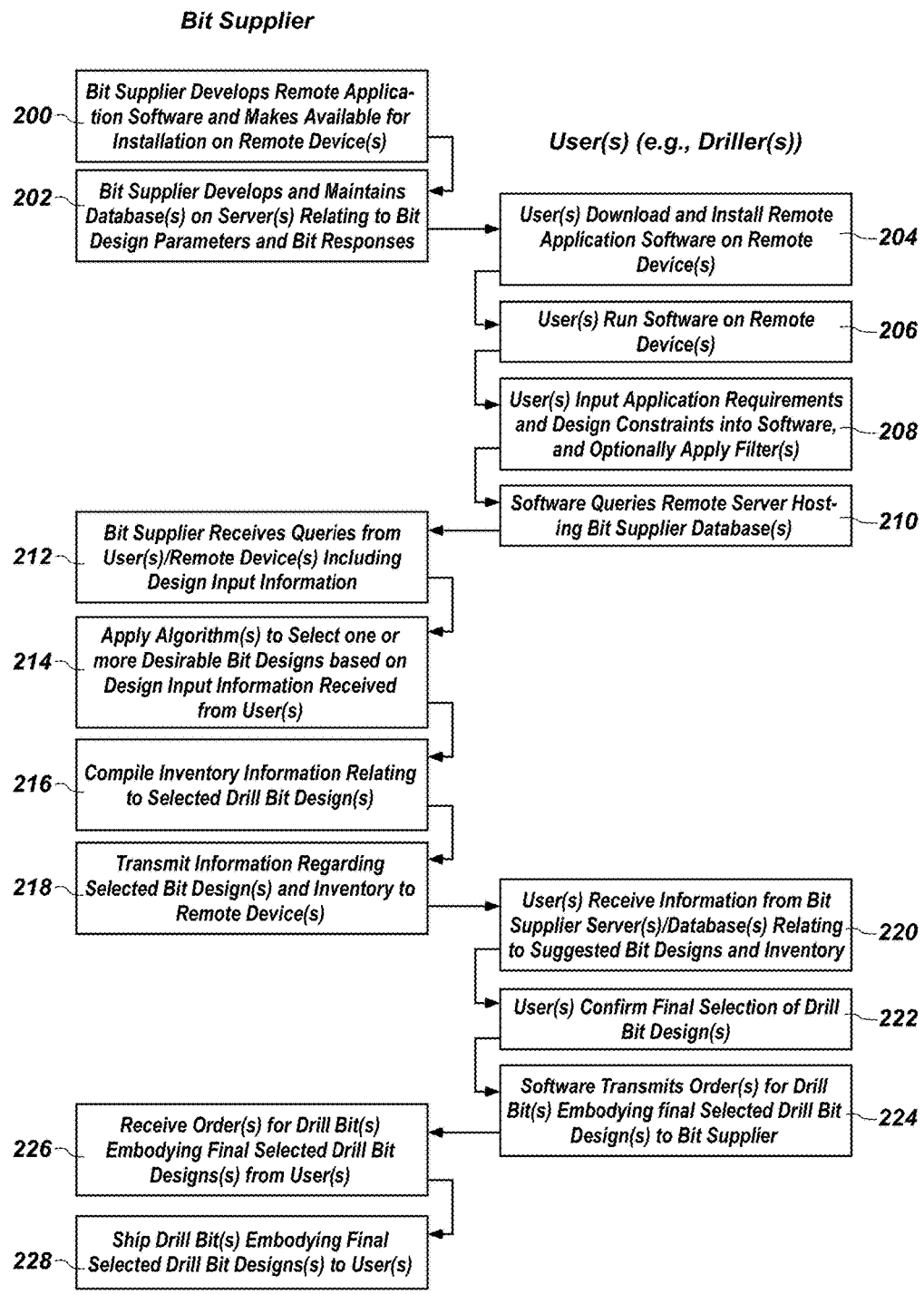
FIG. 2 is a process flow chart illustrating activities that may be performed by suppliers of earth-boring rotary drill bits and end users of such earth-boring rotary drill bits (e.g., drillers) in accordance with embodiments of methods of the present disclosure.

FIG. 2 is a process flow chart illustrating activities that may be performed by suppliers of earth-boring rotary drill bits and end users of such earth-boring rotary drill bits (e.g., drillers) in accordance with embodiments of methods of the present disclosure. In FIG. 2, activities performed by the drill bit supplier are shown in the left hand column, while activities performed by the potential users of the drill bits (e.g., drillers) are shown in the right hand column.

As shown in FIG. 2, in action 200, a drill bit supplier will develop remote application software to be executed by the remote devices 108 (FIG. 1) of the users. For example, the remote application software may be an "app," which may be downloaded onto a mobile telephone of tablet computer sold by Apple, of Cupertino, Calif. through the ITUNES store, or downloaded onto a mobile telephone or tablet computer running ANDROID software available from Google, Inc. of Mountain View, Calif. through the PLAY store. Alternatively, the remote application software may be executable by a desktop computer and downloadable over the Internet. The remote application software may be configured to assist the user in selecting a drill bit design to be used in a particular drilling application as described below with reference to FIGS. 4-7.

With continued reference to FIG. 2, in action 202, the drill bit supplier also develops and maintains one or more databases stored in the memory device(s) 106 of the computer server(s) 102 of the system 100 (FIG. 1). As previously mentioned, the database(s) may include information relating to, for example, drill bit designs, drill bit responses, drill bit design features, technical records relating to performance of previously formed and used drill bits, and/or inventory of actual physical drill bits embodying the drill bit designs. In other words, the drill bit supplier creates the computer server(s) 102 of FIG. 1 in action 202 of FIG. 2.

Figure 3:
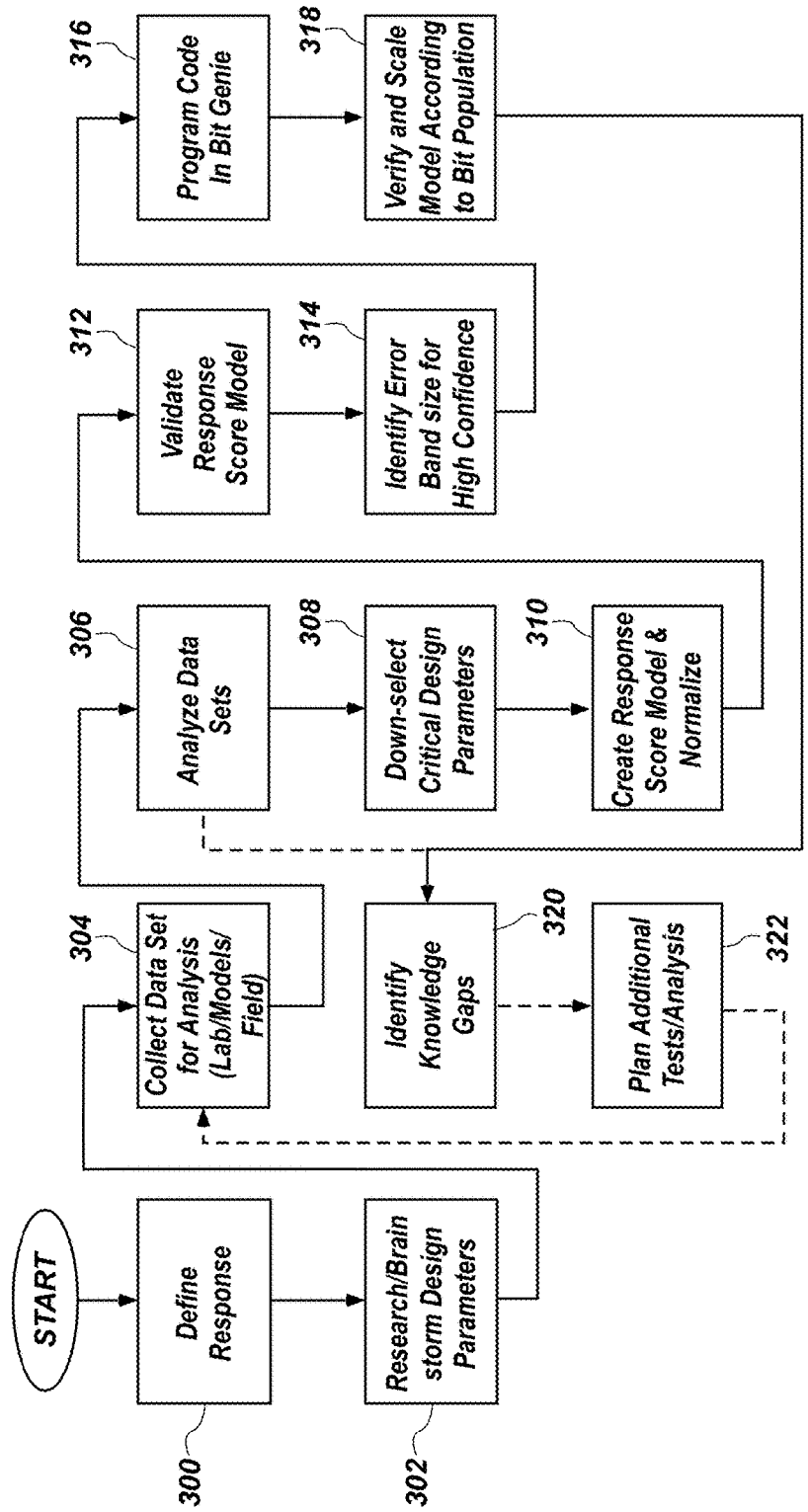
FIG. 3 is a process flow chart illustrating activities that may be performed by suppliers of earth-boring rotary drill bits to develop and maintain software and databases as part of the activities of the methods illustrated in FIG. 2.

FIG. 3 is a process flow chart illustrating activities that may be performed by a supplier of drill bits to develop the database in accordance with action 202 of FIG. 2. As shown in FIG. 3, a drill bit response may be selected and defined in action 300. As previously mentioned, the response could be one or more of aggressiveness, cleaning efficiency, lateral stability, torsional stability, side-cutting aggressiveness, wear durability, and impact durability. Other drill bit responses also may be selected and defined.

In action 302, the parameters of a drill bit design that affect the selected response may be identified through research and/or empirical studies. Such drill bit design parameters may include, amongst others, size, number and shape (profile) of blades, size, number and type of cutting elements, location and orientation of the cutting elements, number, location, and orientation of fluid nozzles, and presence of other features such as wear knots, depth-of-cut control features, etc. For any given response, some such parameters will affect the response, while others may not. Additionally, the degree to which the parameters affect any particular drill bit response may vary between the different drill bit design parameters.

In action 304, data quantitatively relating the design parameters identified in action 302 to the drill bit response identified in action 300 may be collected for analysis. The data may be collected from any one or more of laboratory testing, field testing, computer generated models and simulations, etc. The data collected in action 304 then may be analyzed in action 306 to identify design parameters significantly affecting the drill bit response, and to quantitatively correlate the design parameter to the drill bit response. In action 308, some of the design parameters may be eliminated if they are found not to significantly affect the drill bit response. In action 310, response score models may be created and normalized. For example, drilling responses may be normalized on a scale of 1 to 100, 1 being "low" or "poor" and 100 being "high" or "excellent." Thus, as any particular design parameter varies between lower and upper bounds, the design parameter may push the drill bit response up or down on the normalized scale, and a factor may be identified relating the rate of change of the drill bit response as a function of the rate of change of the design parameter.

Drill bit responses and design parameters may be dependent upon one another, and variation of one drill bit response or design parameter may necessitate automatic variation(s)) in other drill bit responses and/or design parameters.

In action 312, the response score models created in action 310 may be validated through additional testing or analysis, and in action 314 an error band size for any particular response score model optionally may be identified.

Once the drill bit response score models have been created, normalized, and validated, the information may be stored in the database in the memory device(s) 106 of the computer server(s) 102 of the system 100 (FIG. 1). In addition, the software (e.g., program code) to be executed by the electronic signal processor(s) 104 of the computer server(s) 102 of the system 100 may be written and stored in the memory device(s) 106 of the computer server(s) 102. As discussed herein, such software may be used to identify and select potential desirable drill bit designs based on information received from a remote device 108 relating to desirable or necessary drill bit response(s) and/or drill bit design parameters.

In action 318 of FIG. 3, the response score models may be verified and scaled according to drill bit design population on an ongoing basis, as potential drill bit designs are added to or removed from the database in the memory device(s) 106 of the computer server(s) 102. At any point, knowledge gaps may be identified and additional testing and analysis may be performed, as shown in actions 320 and 322 of FIG. 3, to improve the performance of the system 100 (FIG. 1) in selecting appropriate drill bit designs for particular drilling applications in accordance with the methods described with reference to FIG. 2.

Referring again to FIG. 2, after the drill bit supplier has developed the remote application software in action 200 and created the computer server(s) 102 of FIG. 1 in action 202, potential user(s) of drill bits will download and install the remote application software onto the remote device(s) 108 (FIG. 1) in action 204 of FIG. 2, and will run the software of the remote device(s) 108 in action 206 of FIG. 2. Upon running the remote application software on the remote device(s) 108, the remote application software will be used in conjunction with the remote device(s) 108 by the user(s)

to input application requirements and design constraints, and to optionally apply design filter(s) to the remote application software in action 208 of FIG. 2.

Figure 4:
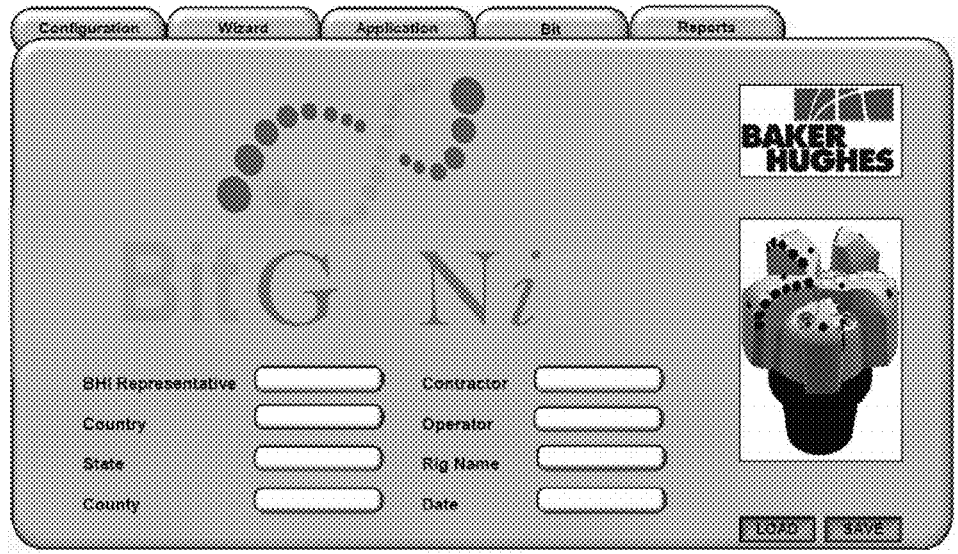
FIG. 4 is an example of an example display of a remote device, such as a mobile telephone or computer running software developed and/or maintained by a bit supplier, and showing fields that may be used by a user to input information into the software.

Referring to FIG. 4, upon launching execution of the remote application software on a remote device 108 (FIG. 1) in accordance with action 206 (FIG. 2), the user may be asked to input certain information such as, for example, information relating to contact personnel of the bit supplier, the location of the drilling rig on which the drill bit to be selected will be used, the name of the drilling rig operator, the identity of the drilling rig, and the current date.

Figure 5:
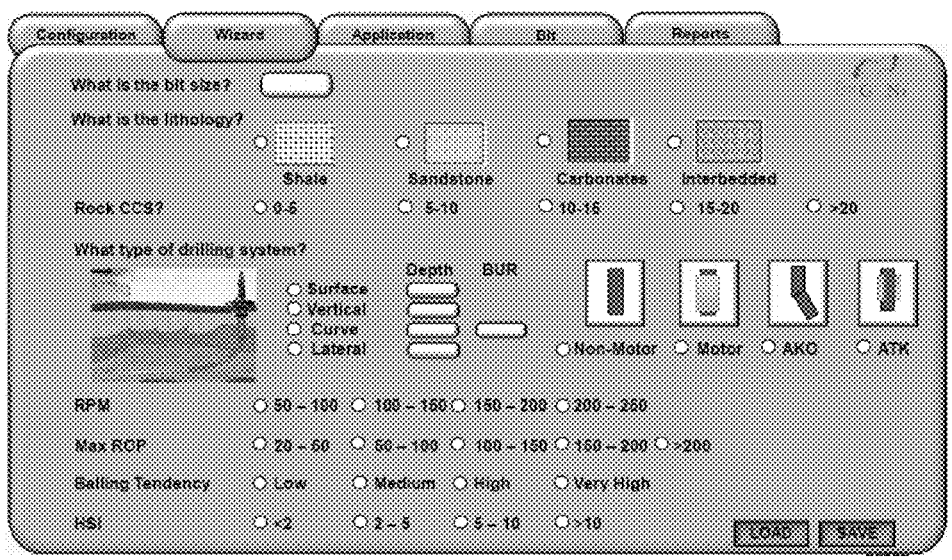
FIG. 5 is similar to FIG. 5, and illustrates fields that may be used by a user to input information into the software relating to a subterranean formation to be drilled, a drilling system to be used to drill the formation with the drill bit to be selected, drilling parameters likely to be employed, and drilling conditions that may be encountered.

Referring to FIG. 5, in accordance with action 208 (FIG. 2), the user then may be asked to input certain information relating to the requirements and limitations of the drilling application in which the drill bit under design will be employed. For example, the user may be asked to provide the drill bit size (i.e., gage diameter), to identify the primary lithography of the subterranean formation to be drilled, and to identify the confined compressive strength (CCS) of the subterranean formation. The user may be asked to provide information relating to the type of the drilling system to be employed at the drilling rig, such as whether the wellbore to be drilled will be or include a surface wellbore segment, a vertical wellbore segment, a curved wellbore segment, or a lateral wellbore segment, and, the respective depths of any such wellbore segments. The user may also identify the build-up rate (BUR) of any curved section. The user may be asked to indicate whether the drilling system to be employed will be a non-motor surface rotary drive system, whether the drilling system will include a downhole hydraulic motor, whether the drilling system will include an adjustable kick off (AKO) sub, and whether the drilling system will include a rotary steerable system (such as the AutoTrak Curve Rotary Steerable System (ATK) available from Baker Hughes Incorporated of Houston, Tex.).

With continued reference to FIG. 5, the user may provide information into the remote application software on the remote device 108 (FIG. 1) relating to the likely operating revolutions per minute (RPM) of the drill bit under design, the maximum rate of penetration (ROP), and to characterize (e.g., as low, medium, high, or very high) the balling tendency for the lithography to be encountered in the wellbore. The user may also be asked to indicate the hydraulic horsepower per square inch (HIS).

Figure 6:
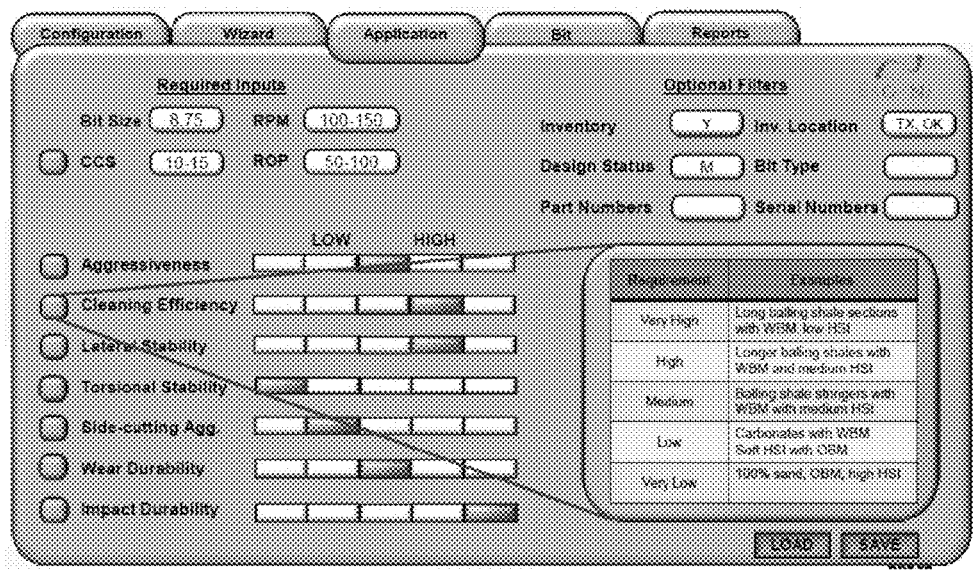
FIG. 6 is similar to FIGS. 4 and 5, and illustrates fields that may be used by a user to input information into the software relating to required drill bit characteristics, relative performance of drill bit responses, and optional filters to be applied to the design search results.

Referring to FIG. 6, once application requirements have been input by the user, the user may be asked to select different values relating to the relative importance of certain drill bit responses for the drill bit under design. For example, as shown in FIG. 6, the remote application software may allow selection of five different values ranging from low importance to high importance for each of the drill bit responses of aggressiveness, cleaning efficiency, lateral stability, torsional stability, side-cutting aggressiveness, wear durability, and impact durability.

The user may also be able to apply one or more optional filters to the results of the design query being generated. For example, the user may limit the results of the design query to only designs of drill bits currently in stock, in stock in a particular location, or to certain drill bit types, part numbers, serial numbers, etc.

Referring again to FIG. 2, once the user has input the application requirements and design constraints into the remote application software on the remote device 108 (FIG. 1), in action 210, the remote application software on the remote device 108 may communicate the input information to the computer server(s) 102 over the network 116 to query potential drill bit designs that may be desirable for the particular drilling application based on the information provided by the user through the remote application software.

In action 212, the computer server(s) 102 (FIG. 1) receive the drill bit design queries from the remote device(s) 108 of the user(s), which include the design input information provided by the users as described with reference to FIGS. 4-6. In action 214, the computer server(s) 102 execute software to apply algorithm(s) to select one or more desirable drill bit designs based on the design input information provided by the users received with the queries. In action 216, the computer server(s) 102 may also compile inventory information relating to actual drill bits that embody the selected drill bit designs. The inventory information may include, for example, information relating to whether or not any actual drill bits exist, a number of existing bits, and locations of any such existing bits.

In action 218, the computer server(s) 102 transmit information regarding selected drill bit designs and corresponding inventory information for the queries back to the remote device(s) 108 that transmitted the queries, respectively. At the same time, the user(s) receive the information transmitted from the computer server(s) 102 to the remote device(s) 108 regarding selected drill bit designs and corresponding inventory information.

Figure 7:
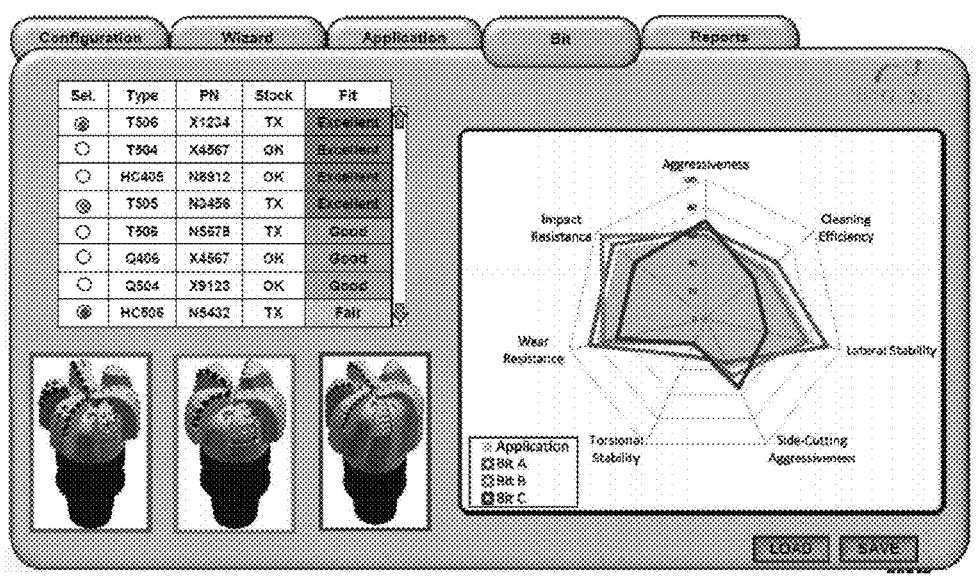
FIG. 7 is similar to FIGS. 4 and 5, and illustrates report information displayed or otherwise output by the software regarding potential desirable drill bit designs that may be selected based on the information input into the software by the user.

For example, FIG. 7 is similar to FIGS. 4-6 and illustrates information regarding potential desirable designs transmitted to a remote device 108 and displayed on the input/output device 114 (e.g., a touchscreen) of the remote device 108. The information may include, for example, the type, part number, stock location, and information regarding the degree to which the drill bit design matches or satisfies the design input information provided by the user, for one or more potential drill bit designs. The information may be presented in list form, as shown in FIG. 7.

Alternatively or in addition, the information may be presented in the form of a graphical representation. In other words, the information transmitted from the computer server may be presented in the form of a graphical display, e.g., a chart or graph. For example, FIG. 7 illustrates a radar chart, which is a graphical method of displaying multivariate data in the form of a two-dimensional chart of multiple quantitative variables represented on axis starting from the same center point. The radar chart shown in FIG. 7 includes seven axes, each axis representing one of the seven drill bit responses of aggressiveness, cleaning efficiency, lateral stability, torsional stability, side-cutting aggressiveness, wear durability, and impact durability. The distance along each axis from the center point represents a relative normalized score for that respective drill bit response. The shaded region in the radar chart of FIG. 7 represents the ideal drill bit perfectly matching the input information provided by the user in action 208 of FIG. 2 (as described with reference to FIGS. 5 and 6). The three lines generally circumscribing the shaded region in the radar chart of FIG. 7 represent the normalized values for the seven drill bit responses for three potential drill bit designs. The degree to which these drill bit designs match or satisfy the design input information provided by the user may be determined by measuring the areas of the shaded region in the radar chart falling outside and/or inside of the lines corresponding to the three drill bit designs, respectively.

As shown in FIG. 7, images or photographs of the potential drill bit designs also may be transmitted from the computer server(s) 102 to the remote device(s) 108 in actions 218 and 220 of FIG. 2.

Referring again to FIG. 2, in action 222, the user(s) may be asked through the remote application software to confirm a final selection of a drill bit design for the respective drilling application using the remote device(s) 108. Optionally, the final selections of the drill bit designs for respective drilling applications may then be transmitted to the computer server(s) 102 from the remote device(s) 108 in actions 224 and 226 as an order for an actual physical drill bit embodying the selected design. The drill bit supplier then may fulfill the order(s) and ship the actual physical drill bit(s) embodying the final selected design(s) to the user(s) in action 228.

In accordance with additional embodiments of the disclosure, at least some of the information input into the remote application software in accordance with action 208 of FIG. 2 may be acquired from information obtained through measurement-while-drilling (MWD) and/or logging-while-drilling (LWD) systems while drilling offset wellbores proximate to the wellbore to be drilled by the bit under design. In addition, at least some such information may be at least substantially automatically uploaded (i.e., input) into the remote application software, rather than manually input by a user.

Optionally, the drilling performance (in relation to any one or more drill bit responses) of physical drill bits embodying designs selected using the methods and systems and described herein may be recorded and used to improve the accuracy and sophistication of the algorithms of the software executed by the computer server(s) 102 in identifying and selecting desirable drill bit designs.

As the information in the databases stored in the memory device(s) 106 of the computer server(s) 102 increases, and the algorithms of the software executed by the computer server(s) 102 become more sophisticated and accurate in identifying and selecting desirable drill bit designs, the information and knowledge acquired therefrom may be used to diagnose performance trends for particular drilling applications.

Figure 8:
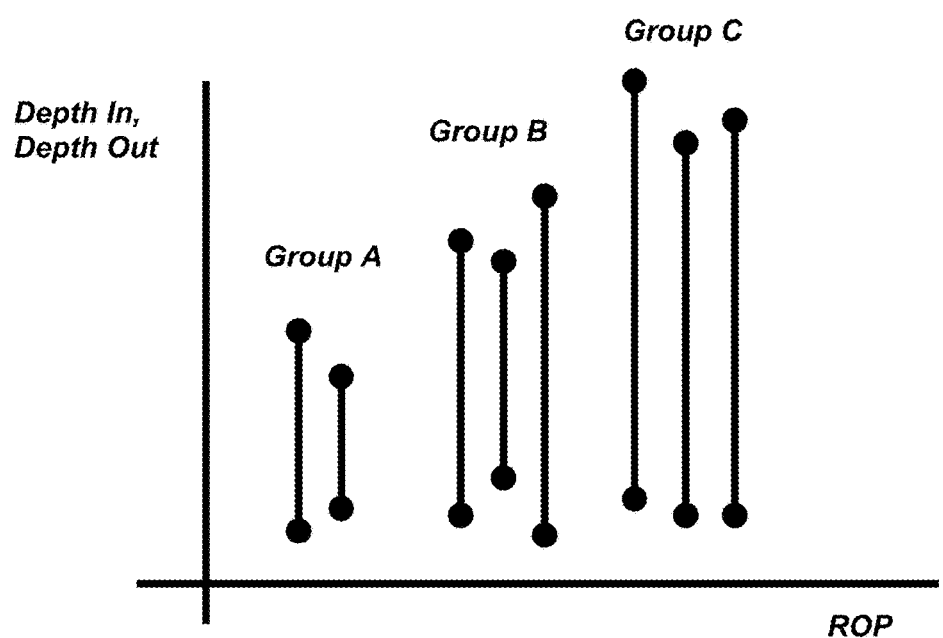
FIG. 8 is an example of a graph illustrating the depth in and depth out for drill bits in each of three different groups of drill bits, as a function of rate of penetration exhibited by the drill bits.
Figure 9:
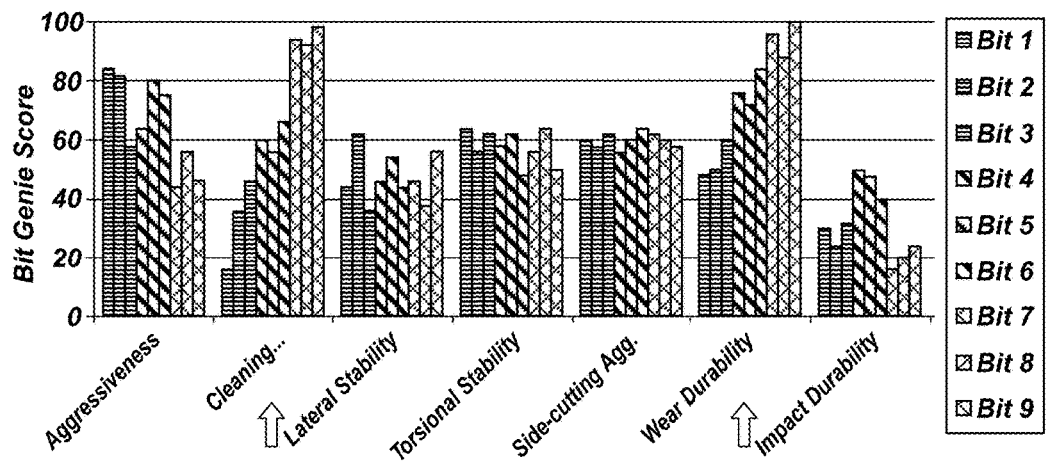
FIG. 9 is an example of a graph illustrating the relative performance of each of the drill bits of FIG. 8, as indicated by a normalized score shown on the Y axis, for each of seven different drill bit responses.

For example, FIG. 8 is a simplified graph illustrating the depth in (wellbore depth at which drilling with a respective drill bit is commenced) and depth out (wellbore depth at which drilling will a respective drill bit is terminated) for a plurality of drill bits that were drilled at differing rates of penetration (ROP). As shown in FIG. 8, Group A drill bits drilled the shortest sections of the wellbore, Group B drill bits drilled sections of intermediate length of the wellbore, and Group C drill bits drilled the longest sections of the wellbore. Thus, the drill bits of Group C may be considered to have the drill bit designs that exhibit the most desirable performance of the three groups. FIG. 9 is a bar graph illustrating the respective score for each drill bit design of the three groups of FIG. 8 for each of the seven drill bit responses of aggressiveness, cleaning efficiency, lateral stability, torsional stability, side-cutting aggressiveness, wear durability, and impact durability. As can be seen in FIG. 9, the drill bits of Group C had designs exhibiting the highest score for the drill bit responses of cleaning efficiency and wear durability. Thus, it may be inferred that these drill bit responses of cleaning efficiency and wear durability are important or even critical drill bit responses for this particular drilling application.

Figure 10:
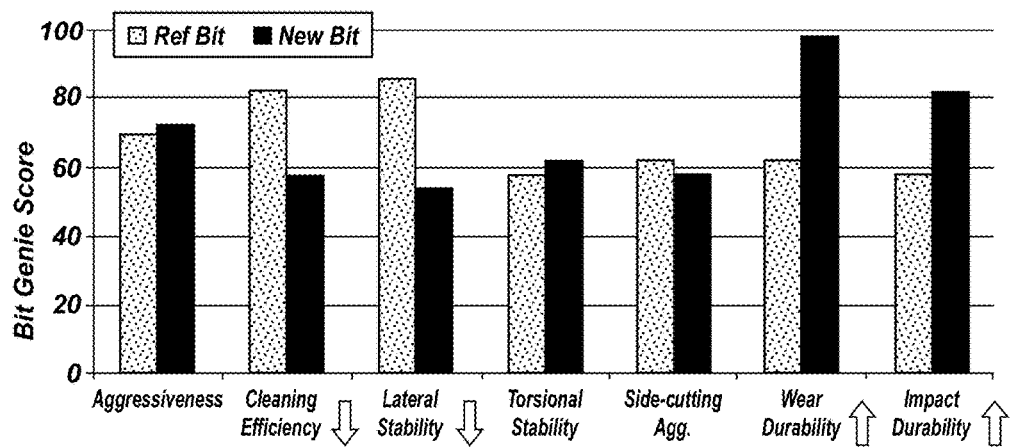
FIG. 10 is a graph similar to that of FIG. 9, but illustrating the relative performance of each of a reference drill bit and a new drill bit under design, as indicated by a normalized score shown on the Y axis, for each of the same seven different drill bit responses, and further indicating how four of the responses will change in relation to alteration of particular drill bit design features.

FIG. 10 is a hypothetical bar graph illustrating the respective normalized scores for each of a reference drill bit previously successfully used in a particular drilling application, and a potential new bit design for that particular drilling application, for each of the seven drill bit responses of aggressiveness, cleaning efficiency, lateral stability, torsional stability, side-cutting aggressiveness, wear durability, and impact durability. As can be seen in FIG. 10, the new bit design exhibits higher scores for the responses of wear durability and impact durability, but lower scores for the responses of cleaning efficiency and lateral stability. Thus, the algorithms of the software executed by the computer server(s) 102 of the system 100 (FIG. 1) may be configured to predict the effect variations in particular drill bit design parameters (such as those previously mentioned herein) may have on these normalized scores for the responses of wear durability, impact durability, cleaning efficiency and lateral stability. In this way, the software may recommend certain changes in those design parameters so as to bring the scores for the drill bit responses of the new bit design closer to the scores for the drill bit responses of the reference bit design.

Embodiments of systems and methods of the present disclosure may be used to provide at least substantially real-time recommendations regarding potential drill bit designs to drilling rig operators and/or field engineers by way of a remote device, which may be mobile (e.g., a mobile telephone, tablet computer, or laptop computer). The systems and methods described herein also may enable drill bit suppliers to identify redundancies in drill bit designs, or gaps in drill bit designs that might usefully serve particular drilling applications.

Additional non-limiting example embodiments of the disclosure are set forth below.

Embodiment 1: A system for selecting a design for an earth-boring rotary drill bit, comprising: a computer server including at least one electronic signal processor and at least one memory device; and at least one remote device located remote from the computer server and configured to communicate with the computer server through a network, the at least one remote device including at least one electronic signal processor and at least one memory device, wherein the computer server includes at least one database stored in the at least one memory device including information relating to normalized scores for each of a plurality of drill bit responses for each of a plurality of differing drill bit designs, and wherein the computer server is configured under control of a computer program to receive information from the at least one remote device, select one or more potential drill bit designs from the at least one database based on the information received from the at least one remote device, and transmit information relating to the normalized scores for each of the plurality of drill bit responses of the selected one or more potential drill bit designs to the at least one remote device for graphical display on a display of the at least one remote device.

Embodiment 2: The system of Embodiment 1, wherein the computer server is configured to transmit information relating to the normalized scores for each of the plurality of drill bit responses of multiple potential drill bit designs of the one or more potential drill bit designs for simultaneous graphical display on the display of the at least one remote device.

Embodiment 3: The system of Embodiment 1 or Embodiment 2, wherein the computer server is configured under control of a computer program to receive information from the at least one remote device regarding one or more of drill bit gage diameter, primary lithography of a subterranean formation to be drilled, and confined compressive strength of the subterranean formation to be drilled.

Embodiment 4: The system of any one of Embodiments 1 through 3, wherein the computer server is configured under control of a computer program to receive information from the at least one remote device regarding one or more of operating revolutions per minute of the drill bit, maximum rate of penetration of the drill bit, and a balling tendency of a lithography to be encountered by the drill bit.

Embodiment 5: The system of any one of Embodiments 1 through 4, wherein the computer server is configured under control of a computer program to receive information from the at least one remote device regarding at least a portion of a geometric trajectory of a wellbore to be drilled.

Embodiment 6: The system of any one of Embodiments 1 through 5, wherein the plurality of drill bit responses includes one or more of aggressiveness, cleaning efficiency, lateral stability, torsional stability, side-cutting aggressiveness, wear durability, and impact durability.

Embodiment 7: The system of any one of Embodiments 1 through 6, wherein the computer server is configured under control of a computer program to receive information from the at least one remote device regarding an assigned relative importance of each drill bit response of the plurality of drill bit responses.

Embodiment 8: The system of Embodiment 7, wherein the computer server is configured under control of a computer program to transmit information to the at least one remote device regarding the degree to which each of the one or more potential drill bit designs satisfies the assigned relative importance of each drill bit response of the plurality of drill bit responses.

Embodiment 9: The system of any one of Embodiments 1 through 8, wherein the computer server is configured under control of a computer program to transmit information to the at least one remote device regarding at least one of a plurality of drill bit design parameters.

Embodiment 10: The system of Embodiment 9, wherein the plurality of drill bit design parameters includes at least one of size of blades, number of blades, profile of blades, size of cutting elements, number of cutting elements, types of cutting elements, location of cutting elements, orientation of cutting elements, number of fluid nozzles, location of fluid nozzles, and orientation of fluid nozzles.

Embodiment 11: The system of any one of Embodiments 1 through 10, wherein the computer server is configured under control of a computer program to transmit information to the at least one remote device regarding inventory information related to one or more potential drill bit designs.

Embodiment 12: The system of any one of Embodiments 1 through 11, wherein the at least one remote device comprises at least one of a mobile telephone, a tablet computer, a laptop computer, and a desktop computer.

Embodiment 13: The system of any one of Embodiments 1 through 12, wherein the at least one remote device is a mobile device.

Embodiment 14: A method of selecting a design for an earth-boring rotary drill bit, comprising: receiving, in a computer server, information from the at least one remote device through a network, the computer server including at least one electronic signal processor and at least one memory device and having at least one database stored in the at least one memory device including information relating to normalized scores for each of a plurality of drill bit responses for each of a plurality of differing drill bit designs, the at least one remote device also including at least one electronic signal processor and at least one memory device; executing software using the computer server, execution of the software using the computer server resulting in automatic selection of one or more potential drill bit designs from the at least one database based on the information received from the at least one remote device; transmitting information relating to the normalized scores for each of the plurality of drill bit responses of the selected one or more potential drill bit designs to the at least one remote device; and graphically displaying the normalized scores of the plurality of drill bit responses of the selected one or more potential drill bit designs on a display of the at least one remote device.

Embodiment 15: The method of Embodiment 14, wherein executing software using the computer server, execution of the software resulting in automatic selection of one or more potential drill bit designs from the at least one database based on the information received from the at least one remote device further comprises automatic selection of one or more potential drill bit designs from the at least one database based on technical records relating to performance of previously formed and used drill bits.

Embodiment 16: The method of Embodiment 14 or Embodiment 15, further comprising receiving, in the computer server, an order for an actual physical drill bit embodying the selected one or more potential drill bit designs.

Embodiment 17: A method of selecting a design for an earth-boring rotary drill bit, comprising: inputting information relating to a drilling application into at least one remote device, the at least one remote device also including at least one electronic signal processor and at least one memory device; transmitting the information from the at least one remote device to a computer server through a network, the computer server including at least one electronic signal processor and at least one memory device and having at least one database stored in the at least one memory device including information relating to normalized scores for each of a plurality of drill bit responses for each of a plurality of differing drill bit designs; and receiving, in the at least one remote device, a graphical representation of information relating to the normalized scores for each of the plurality of drill bit responses for each of the one or more potential drill bit designs for the drilling application from the computer server.

Embodiment 18: The method of Embodiment 17, wherein receiving, in the at least one remote device, information relating to one or more potential drill bit designs for the drilling application from the computer server comprises receiving, in the at least one remote device, a graphical representation comparing corresponding normalized scores for each of the plurality of drill bit responses for a plurality of drill bit designs of the one or more potential drill bit designs.

Embodiment 19: The method of Embodiment 17 or Embodiment 18, further comprising inputting information comprising an order for an actual physical drill bit embodying a drill bit design of the one or more potential drill bit designs.

Embodiment 20: The method of Embodiment 19, further comprising inputting into the at least one database information related to actual performance of the physical drill bit in the drilling application.

While certain illustrative embodiments have been described in connection with the figures, those of ordinary skill in the art will recognize and appreciate that the scope of this disclosure is not limited to those embodiments explicitly shown and described herein. Rather, many additions, deletions, and modifications to the embodiments described herein may be made to produce embodiments within the scope of this disclosure, such as those hereinafter claimed, including legal equivalents. In addition, features from one disclosed embodiment may be combined with features of another disclosed embodiment while still being within the scope of this disclosure, as contemplated by the inventors.

What is claimed is:

1. A system for selecting a design for an earth-boring rotary drill bit, comprising:
a computer server and at least one remote device located remote from the computer server and in communication with the computer server through a network,
wherein the computer server comprises:
at least one processor; and
at least one non-transitory computer-readable storage medium storing instruction thereon that, when executed by the at least one processor, cause the computer server to:
receive bit requirement and restraint information from the at least one remote device;
search at least one database stored in the at least one non-transitory computer-readable storage medium, the at least one database comprising data related to normalized scores for each of a plurality of drill bit responses for each of a plurality of differing drill bit designs;
select one or more potential drill bit designs from the at least one database based on the bit requirement and restraint information received from the at least one remote device; and
transmit data related to the normalized scores for each of the plurality of drill bit responses of the selected one or more potential drill bit designs to the at least one remote device for graphical display on a display of the at least one remote device.

2. The system of claim 1, wherein the computer server further comprises instructions that, when executed by the at least one processor, cause the computer server to transmit data related to the normalized scores for each of the plurality of drill bit responses of multiple potential drill bit designs of the one or more potential drill bit designs for simultaneous graphical display on the display of the at least one remote device.

3. The system of claim 1, wherein the bit requirement and restraint information comprises one or more of drill bit gage diameter, primary lithography of a subterranean formation to be drilled, or confined compressive strength of the subterranean formation to be drilled.

4. The system of claim 1, wherein the bit requirement and restraint information comprises one or more of operating revolutions per minute of the drill bit, maximum rate of penetration of the drill bit, or a balling tendency of a lithography to be encountered by the drill bit.

5. The system of claim 1, wherein the bit requirement and restraint information comprises at least a portion of a geometric trajectory of a wellbore to be drilled.

6. The system of claim 1, wherein the plurality of drill bit responses comprises one or more of aggressiveness, cleaning efficiency, lateral stability, torsional stability, side-cutting aggressiveness, wear durability, or impact durability.

7. The system of claim 6, wherein the bit requirement and restraint information comprises an assigned relative importance of each drill bit response of the plurality of drill bit responses.

8. The system of claim 7, wherein the data related to the normalized scores comprises a degree to which each of the one or more potential drill bit designs satisfies the assigned relative importance of each drill bit response of the plurality of drill bit responses.

9. The system of claim 1, wherein the data related to the normalized scores comprises at least one of a plurality of drill bit design parameters.

10. The system of claim 9, wherein the plurality of drill bit design parameters comprises at least one of size of blades, number of blades, profile of blades, size of cutting elements, number of cutting elements, types of cutting elements, location of cutting elements, orientation of cutting elements, number of fluid nozzles, location of fluid nozzles, or orientation of fluid nozzles.

11. The system of claim 1, wherein the data related to the normalized scores comprises inventory information related to one or more potential drill bit designs.

12. The system of claim 1, wherein the at least one remote device comprises at least one of a mobile telephone, a tablet computer, a laptop computer, or a desktop computer.

13. The system of claim 1, wherein the at least one remote device comprises a mobile device.

14. A method of selecting a design for an earth-boring rotary drill bit, comprising:
receiving, at a computer server, bit requirement and restraint information from at least one remote device through a network,
searching at least one database of the computer server, the at least one database comprising data related to normalized scores for each of a plurality of drill bit responses for each of a plurality of differing drill bit designs;
automatically selecting one or more potential drill bit designs from the at least one database based on the bit requirement and restraint information received from the at least one remote device; and
transmitting data related to the normalized scores for each of the plurality of drill bit responses of the selected one or more potential drill bit designs to the at least one remote device.

15. The method of claim 14, wherein automatically selecting one or more potential drill bit designs from the at least one database based on the bit requirement and restraint information received from the at least one remote device further comprises automatically selecting one or more potential drill bit designs from the at least one database based on technical records relating to performance of previously formed and used drill bits.

16. The method of claim 14, further comprising receiving, at the computer server, an order for an actual physical drill bit embodying a drill bit design corresponding to the selected one or more potential drill bit designs.

17. A method of selecting a design for an earth-boring rotary drill bit, comprising:
receiving an input of bit requirement and restraint information relating to a drilling application at an at least one remote device;
transmitting, via a processor, the bit requirement and restraint information from the at least one remote device to a computer server through a network;
receiving, at the at least one remote device, data related to normalized scores for each of a plurality of drill bit responses for each of one or more automatically-selected potential drill bit designs for the drilling application from the computer server;
generating a graphical representation of the data related to the normalized scores for each of a plurality of drill bit responses for each of the one or more automatically-selected potential drill bit designs; and
displaying the graphical representation on a display of the at least one remote device.

18. The method of claim 17, wherein receiving, at the at least one remote device, data related to the normalized scores for each of a plurality of drill bit responses for each of the one or more automatically-selected potential drill bit designs comprises receiving data comparing normalized scores for each of the plurality of drill bit responses for a plurality of drill bit designs of the one or more potential drill bit designs.

19. The method of claim 17, further comprising receiving an input of an order for an actual physical drill bit embodying a drill bit design of the one or more potential drill bit designs.

20. The method of claim 19, further comprising transmitting to the computer server actual performance data of the physical drill bit acquired during the drilling application.

* * * * *